(12) United States Patent
Lau et al.

(10) Patent No.: US 6,864,309 B2
(45) Date of Patent: Mar. 8, 2005

(54) METHOD FOR PREPARING GRAFT COPOLYMERS AND COMPOSITIONS PRODUCED THEREFROM

(75) Inventors: Willie Lau, Ambler, PA (US); Karl Allen Bromm, Doylestown, PA (US); Paul Ralph Van Rheenen, Warminster, PA (US)

(73) Assignee: Rohm and Haas Company, Philadephia, PA (US)

( * ) Notice: Subject to any disclaimer, the term of this patent is extended or adjusted under 35 U.S.C. 154(b) by 0 days.

(21) Appl. No.: 10/763,790

(22) Filed: Jan. 23, 2004

(65) Prior Publication Data

US 2004/0167269 A1 Aug. 26, 2004

Related U.S. Application Data

(62) Division of application No. 09/951,494, filed on Sep. 13, 2001, now Pat. No. 6,723,775.
(60) Provisional application No. 60/232,414, filed on Sep. 14, 2000.

(51) Int. Cl.[7] .................................................. C08J 3/02
(52) U.S. Cl. ........................ 524/457; 524/458; 524/609
(58) Field of Search ................................ 524/457, 458; 524/609

(56) References Cited

U.S. PATENT DOCUMENTS

| | | | |
|---|---|---|---|
| 3,862,077 A | * | 1/1975 | Schultz et al. .............. 524/417 |
| 5,028,677 A | | 7/1991 | Janowicz |
| 5,247,040 A | | 9/1993 | Amick et al. |
| 5,264,530 A | | 11/1993 | Darmon et al. |
| 5,314,977 A | | 5/1994 | Amick et al. |
| 5,521,266 A | | 5/1996 | Lau |
| 5,602,220 A | | 2/1997 | Haddleton et al. |
| 5,756,605 A | | 5/1998 | Moad et al. |
| 5,804,632 A | | 9/1998 | Haddleton et al. |
| 5,936,026 A | | 8/1999 | Huybrechts et al. |
| 6,017,992 A | | 1/2000 | Haddleton et al. |
| 6,107,392 A | | 8/2000 | Antonelli et al. |
| 6,291,620 B1 | | 9/2001 | Moad et al. |

FOREIGN PATENT DOCUMENTS

| | | |
|---|---|---|
| DE | 19757494 | 7/1998 |
| WO | WO 95/19999 | 7/1995 |
| WO | WO 95/32228 | 11/1995 |
| WO | WO 95/32229 | 11/1995 |
| WO | WO 95/32255 | 11/1995 |
| WO | WO 96/15157 | 5/1996 |
| WO | WO 99/03905 | 1/1999 |

OTHER PUBLICATIONS

Applications of Anionic Polymerization Research, R,P. Quirk Ed, ACS Symp. Ser. 896 208(1998); "Practical Applications of Macromonomer Techniques for the Synthesis of Comb–Shapted Copolymers", Authors S. Roos, A.H.E. Muller, M. Kaufmann, W. Siol, C. Auschra.
Journal of Polymer Science Part A: Polymer Chemistry, vol. 34, 3173 3181; "Compatibilization of the PBA/PMMA Core/Shell Latex Interphase, I. Partitioning of PMMA Macromonomer in the PBA Seed Latex," Authors, V. Nelliappan, M.S. El–aasser, A. Klein, E.S. Daniels. and J.E. Roberts.
J. Macromol Sci, —Chem. A27(4)pp. 491–507 (1990), "Copolymerization of Polymethyl Methacrylate Macromers with n–Butyl Acrylate and Mechanical Properties of the Graft Copolymers," Authors Hong–Quan Xie and Shi–Biao Zhou.

* cited by examiner

Primary Examiner—William K. Cheung
(74) Attorney, Agent, or Firm—Richard R. Clikeman

(57) ABSTRACT

An aqueous polymerization method for preparing graft copolymers is disclosed. Copolymer compositions produced therefrom are also disclosed. The method of the present invention includes (a) forming a macromonomer aqueous emulsion containing water insoluble macromonomer particles; (b) forming a monomer composition containing at least one ethylenically unsaturated monomer; and (c) combining at least a portion of the macromonomer aqueous emulsion and at least a portion of the monomer composition and polymerizing the resulting polymerization reaction mixture in the presence of an initiator to form a copolymer composition. The copolymer composition produced contains water insoluble particles of graft copolymer.

13 Claims, No Drawings

METHOD FOR PREPARING GRAFT COPOLYMERS AND COMPOSITIONS PRODUCED THEREFROM

This application is a division of Ser. No. 09/951,494 filed Sep. 13, 2001, now U.S. Pat. No. 6,723,775 which derives priority from provisional patent application Ser. No. 60/232,414 filed Sep. 14, 2000.

FIELD OF INVENTION

This invention relates to a method for making graft copolymers using an aqueous emulsion polymerization process, and copolymer compositions produced therefrom. More particularly, this invention relates to an aqueous emulsion polymerization process for polymerizing at least one macromonomer and at least one ethylenically unsaturated monomer to form a copolymer composition containing graft copolymers.

BACKGROUND OF THE INVENTION

"Graft copolymers" as used herein are macromolecules formed when polymer or copolymer chains are chemically attached as side chains to a polymeric backbone. Generally, the side chains are of a different polymeric composition than the backbone chain. Because graft copolymers often chemically combine unlike polymeric segments in one molecule, these copolymers have unique properties compared to the corresponding random analogues. These properties include, for example, mechanical film properties resulting from thermodynamically driven microphase separation of the polymer, and decreased melt viscosities resulting in part from the branched structure of the graft copolymer. With respect to the latter, reduced melt viscosities can advantageously improve processability of the polymer. See e.g., Hong-Quan Xie and Shi-Biao Zhou, J. Macromol. Sci.-Chem., A27(4), 491–507 (1990); Sebastian Roos, Axel H. E. Müller, Marita Kaufmann, Werner Siol and Clenens Auschra, "Applications of Anionic Polymerization Research", R. P. Quirk, Ed., ACS Symp. Ser. 696, 208 (1998).

The term "comb copolymer," as used herein, is a type of graft copolymer, where the polymeric backbone of the graft copolymer is linear, and each side chain of the graft copolymer is formed by a "macromonomer" that is grafted to the polymer backbone. "Macromonomers" are low molecular weight polymers having at least one functional group at the end of the polymer chain that can further polymerize with others monomers to yield comb copolymers. See e.g., Kawakami in the "Encyclopedia of Polymer Science and Engineering", Vol. 9, pp. 195–204, John Wiley & Sons, New York, 1987. The term "linear," as used herein, is meant to include polymers where minor amounts of branching has occurred through hydrogen abstraction that is normally observed in free radical polymerizations. The comb copolymers are commonly prepared by the free radical copolymerization of macromonomer with conventional monomer (e.g., ethylenically unsaturated monomers).

Comb copolymers prepared with water-insoluble macromonomers have been predominantly prepared using bulk and solution polymerization techniques. However, such processes undesirably use solvent or monomer as the medium in which the polymerization is conducted. Thus, efforts recently have focused on developing methods for preparing comb copolymers via an aqueous emulsion process.

One example, U.S. Pat. No. 5,247,040 to Amick et al., ("Amick"), discloses a two stage emulsion polymerization process for producing graft copolymers. In the first stage, a macromonomer is produced by polymerizing ethylenically unsaturated monomer in the presence of a mercapto-olefin compound. In the second stage, the resulting macromonomer is polymerized in an aqueous emulsion with a second ethylenically unsaturated monomer. The Amick process, although having many advantages, produces a graft copolymer having linkages, located between the side chains and backbone, that are susceptible to hydrolysis under certain conditions. These linkages result from using a mercapto-olefin compound having an ester functionality in the preparation of the macromonomer.

U.S. Pat. No. 5,264,530 to Darmon et al. ("Darmon") discloses an emulsion or suspension free radical polymerization process where one or more monomer species is polymerized in the presence of a macromonomer that is used as a chain transfer agent. As the macromonomer is being used as a chain transfer agent, the macromonomer is predominately incorporated into the polymer chain at the ends.

U.S. Pat. No. 5,804,632 to Haddleton et al. ("Haddleton") discloses an aqueous polymer emulsion process that includes preparing, in the presence of a cobalt chelate complex, a low molecular weight polymer having acid functional groups, and subsequently polymerizing at least one olefinically unsaturated monomer in the presence of the low molecular weight polymer to form a hydrophobic polymer. The low molecular weight polymer in Haddleton is taught to contain a sufficient concentration of acid to render the low molecular weight polymer, as is, or upon neutralization of the acid groups, partially or more preferably fully dissolvable in an aqueous medium. Although Haddleton discloses that some degree of grafting may occur, Haddleton focuses on processes where it is believed that the hydrophobic polymer particles are encapsulated by the low molecular weight polymer in the form of an "inverted core-shell" latex, or where the low molecular weight polymer serves simply as a seed for the polymerization to form the hydrophobic polymer. Thus, Haddleton does not disclose a process to produce graft copolymers of a desired structure such as comb copolymers. It is also believed that using the Haddleton process undesirably results in a substantial amount of low molecular weight polymer remaining unreacted in the water phase.

Publication WO 99/03905 to Huybrechts et al. ("Huybrechts") discloses an anionically stabilized graft copolymer composition that is prepared by emulsion polymerizing acid containing macromonomer and amino functional monomer. The copolymer composition prepared contains from 0.5 to 30 weight percent amino functional monomer in the polymer backbone, and at least 5 weight percent acid functional monomer in the macromonomer that is neutralized with an amine. However, it would be desirable to provide an aqueous emulsion polymerization process for preparing alternative graft copolymer compositions that do not require neutralization.

The present invention seeks to provide a robust emulsion polymerization process for preparing graft copolymers that are preferably resistant to hydrolysis. The present invention also seeks to provide an emulsion polymerization process that preferably provides control over such parameters as polymerization kinetics, polymer structure, conversion, incorporation of macromonomer and particle size.

SUMMARY OF INVENTION

In one aspect of the present invention, a method of making a graft copolymer is provided that includes forming a macromonomer aqueous emulsion containing water-insoluble particles of macromonomer and forming a monomer composition containing ethylenically unsaturated monomer. The macromonomer contains polymerized units of a first ethylenically unsaturated monomer and further has a degree of polymerization of from 10 to 1000, at least one terminal ethylenically unsaturated group, less than 5 weight percent acid-containing monomer as polymerized, and less than 1 mole percent of mercapto-olefin compounds as polymerized. At least a portion of the macromonomer aqueous emulsion and at least a portion of the monomer composition are combined to form a polymerization reaction mixture, and the macromonomer and the second ethylenically unsaturated monomer therein are polymerized in the presence of an initiator to produce a graft copolymer composition containing graft copolymer particles.

In another aspect of the present invention, a graft copolymer composition is provided that contains water insoluble graft copolymer particles. The copolymer particles contain from 2 weight percent to 90 weight percent water insoluble macromonomer, and from 10 weight percent to 98 weight percent of polymerized units of at least one second ethylenically unsaturated monomer, based on the total weight of the copolymer. The macromonomer used to form the graft copolymer composition contains from 10 to 1000 polymerized units of a first ethylenically unsaturated monomer, less than 1 mole percent of polymerized mercapto-olefin compounds, and less than 5 weight percent polymerized acid-containing monomer. In a preferred embodiment, the copolymer composition further contains from 0.2 weight percent to 10 weight percent of an acid containing macromonomer, based on the total weight of the copolymer.

DETAILED DESCRIPTION

The present invention provides an aqueous polymerization process for preparing graft copolymers, and more preferably comb copolymers. The present invention also provides novel copolymer compositions produced from the aqueous polymerization process.

The process of the present invention includes (a) forming a macromonomer aqueous emulsion containing one or more water-insoluble particles of macromonomer; (b) forming a monomer composition containing ethylenically unsaturated monomer; and (c) combining at least a portion of the macromonomer aqueous emulsion and at least a portion of the monomer composition to form a polymerization reaction mixture. The macromonomer and ethylenically unsaturated monomer are polymerized in the presence of an initiator to form graft copolymer particles.

The macromonomer, present in the macromonomer aqueous emulsion as water insoluble particles, is any low molecular weight water-insoluble polymer or copolymer having at least one terminal ethylenically unsaturated group that is capable of being polymerized in a free radical polymerization process. By "water-insoluble" it is meant having a water solubility of no greater than 150 millimoles/liter at 25° C. to 50° C. By "low molecular weight" it is meant that the macromonomer has a degree of polymerization preferably from about 10 to about 1000, and more preferably from about 20 to about 200. By "degree of polymerization" it is meant the number of polymerized monomer units present in the macromonomer.

The macromonomer contains, as polymerized units, at least one type of ethylenically unsaturated monomer. Preferably, the ethylenically unsaturated monomer is selected to impart low or no water solubility to the macromonomer as previously described herein.

Suitable ethylenically unsaturated monomers for use in preparing macromonomer include for example methacrylate esters, such as $C_1$ to $C_{18}$ normal or branched alkyl esters of methacrylic acid, including methyl methacrylate, ethyl methacrylate, n-butyl methacrylate, lauryl methacrylate, stearyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; basic substituted (meth) acrylates and (meth)acrylamides, such as amine-substituted methacrylates including dimethylaminoethyl methacrylate, tertiary-butylaminoethyl methacrylate and dimethylaminopropyl methacrylamide and the likes; dienes such as 1,3-butadiene and isoprene; vinyl ethers; or combinations thereof. The term "(meth)" as used herein means that the "meth" is optionally present. For example, "(meth)acrylate" means methacrylate or acrylate.

The ethylenically unsaturated monomer can also be a functional monomer including for example monomers containing hydroxy, amido, aldehyde, ureido, polyether, glycidylalkyl, keto functional groups or combinations thereof. These functional monomers are generally present in the macromonomer at a level of from about 0.5 weight percent to about 15 weight percent and more preferably from about 1 weight percent to about 3 weight percent, based on the total weight of the graft copolymer. Examples of functional monomers include ketofunctional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomer can provide crosslinking if desired.

The macromonomer also contains as polymerized units less than about 10 weight percent, preferably less than about 5 weight percent, more preferably less than 2 weight percent and most preferably less than about 1 weight percent acid containing monomer, based on the total weight of the macromonomer. In a most preferred embodiment, the macromonomer contains no acid containing monomer. By "acid containing monomer" it is meant any ethylenically unsaturated monomer that contains one or more acid functional groups or functional groups that are capable of forming an acid (e.g., an anhydride such as methacrylic anhydride or tertiary butyl methacrylate). Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof.

The macromonomer also contains, as polymerized, less than about 1 mole percent, preferably less than about 0.5 mole percent, and more preferably no mercapto-olefin compounds, based on the total weight of the macromonomer. These mercapto-olefin compounds are those as described in U.S. Pat. No. 5,247,000 to Amick, which is incorporated herein by reference in its entirety. The mercapto-olefin compounds described in Amick have ester functional groups, which are susceptible to hydrolysis.

In a preferred embodiment of the present invention, the macromonomer is composed of at least about 20 weight percent, more preferably from about 50 weight percent to about 100 weight percent, and most preferably from about 80 to about 100 weight percent of at least one α-methyl vinyl monomer, a non α-methyl vinyl monomer terminated with a α-methyl vinyl monomer, or combinations thereof. In a most preferred embodiment of the present invention the macromonomer contains as polymerized units from about 90 weight percent to about 100 weight percent α-methyl vinyl monomers, non α-methyl vinyl monomers terminated with α-methyl vinyl monomers, or combinations thereof, based on the total weight of the macromonomer. Suitable α-methyl vinyl monomers include, for example, methacrylate esters, such as $C_1$ to $C_{18}$ normal or branched alkyl esters of methacrylic acid, including methyl methacrylate, ethyl methacrylate, butyl methacrylate, 2-ethylhexyl methacrylate, isobornyl methacrylate, lauryl methacrylate, or stearyl methacrylate; hydroxyalkyl methacrylates such as hydroxyethyl methacrylate; glycidylmethacrylate; phenyl methacrylate; methacrylamide; methacrylonitrile; or combinations thereof. An example of a non α-methyl vinyl monomer terminated with an α-methyl vinyl monomer includes styrene terminated by α-methyl styrene.

One skilled in the art will recognize that there are many ways to prepare the macromonomer useful in the present invention. For example, the macromonomer may be prepared by a high temperature (e.g., at least about 150° C.) continuous process such as disclosed in U.S. Pat. No. 5,710,227 or EP-A-1,010,706, published Jun. 21, 2000, the disclosures of which are hereby incorporated by reference in their entireties. In a preferred continuous process, a reaction mixture of ethylenically unsaturated monomers are passed through a heated zone having a temperature of at least about 150° C., and more preferably at least about 275° C. The heated zone may also be maintained at a pressure above atmospheric pressure (e.g., greater than about 30 bar). The reaction mixture of monomers may also optionally contain a solvent such as water, acetone, methanol, isopropanol, propionic acid, acetic acid, dimethylformamide, dimethylsulfoxide, methylethylketone, or combinations thereof.

The macromonomer useful in the present invention may also be prepared by polymerizing ethylenically unsaturated monomers in the presence of a free radical initiator and a catalytic metal chelate chain transfer agent (e.g., a transition metal chelate). Such a polymerization may be carried out by a solution, bulk, suspension, or emulsion polymerization process. Suitable methods for preparing the macromonomer using a catalytic metal chelate chain transfer agent are disclosed in for example U.S. Pat. Nos. 4,526,945, 4,680, 354, 4,886,861, 5,028,677, 5,362,826, 5,721,330, and 5,756, 605; European publications EP-A-0199,436, and EP-A-0196783; and PCT publications WO 87/03605, WO 96/15158, and WO 97/34934, the disclosures of which are hereby incorporated by reference in their entireties.

Preferably, the macromonomer useful in the present invention is prepared by an aqueous emulsion free radical polymerization process using a transition metal chelate complex. Preferably, the transition metal chelate complex is a cobalt (II) or (III) chelate complex such as, for example, dioxime complexes of cobalt, cobalt II porphyrin complexes, or cobalt II chelates of vicinal iminohydroxyimino compounds, dihydroxyimino compounds, diazadihydroxy-iminodialkyldecadienes, or diazadihydroxyiminodialkylundecadienes, or combinations thereof. These complexes may optionally include bridging groups such as $BF_2$, and may also be optionally coordinated with ligands such as water, alcohols, ketones, and nitrogen bases such as pyridine. Additional suitable transition metal complexes are disclosed in for example U.S. Pat. Nos. 4,694,054; 5,770,665; 5,962,609; and 5,602,220, the disclosures of which are hereby incorporated by reference in their entireties. A preferred cobalt chelate complex useful in the present invention is Co II (2,3-dioxyiminobutane-$BF_2$)$_2$, the Co III analogue of the aforementioned compound, or combinations thereof. The spatial arrangements of such complexes are disclosed in for example EP-A-199436 and U.S. Pat. No. 5,756,605.

In preparing macromonomer by an aqueous emulsion polymerization process using a transition metal chelate chain transfer agent, at least one ethylenically unsaturated monomer is polymerized in the presence of a free radical initiator and the transition metal chelate according to conventional aqueous emulsion polymerization techniques. Preferably, the ethylenically unsaturated monomer is an α-methyl vinyl monomer as previously described herein.

The polymerization to form the macromonomer is preferably conducted at a temperature of from about 20° C. to about 150° C., and more preferably from about 40° C. to about 95° C. The solids level at the completion of the polymerization is typically from about 5 weight percent to about 65 weight percent, and more preferably from about 30 weight percent to about 50 weight percent, based on the total weight of the aqueous emulsion.

The concentration of initiator and transition metal chelate chain transfer agent used during the polymerization process is preferably chosen to obtain the desired degree of polymerization of the macromonomer. Preferably, the concentration of initiator is from about 0.2 weight percent to about 3 weight percent, and more preferably from about 0.5 weight percent to about 1.5 weight percent, based on the total weight of monomer. Preferably, the concentration of transition metal chelate chain transfer agent is from about 5 ppm to about 200 ppm, and more preferably from about 10 ppm to about 100 ppm, based on the total moles of monomer used to form the macromonomer.

The ethylenically unsaturated monomer, initiator, and transition metal chelate chain transfer agent may be added in any manner known to those skilled in the art to carry out the polymerization. For example, the monomer, initiator and transition metal chelate may all be present in the aqueous emulsion at the start of the polymerization process (i.e., a batch process). Alternatively, one or more of the components may be gradually fed to an aqueous solution (i.e., a continuous or semi-batch process). For example, it may be desired to gradually feed the entire or a portion of the initiator, monomer, and/or transition metal chelate to a solution containing water and surfactant. In a preferred embodiment, at least a portion of the monomer and transition metal chelate are gradually fed during the polymerization, with the remainder of the monomer and transition metal chelate being present in the aqueous emulsion at the start of the polymerization. In this embodiment, the monomer may be fed as is, or suspended or emulsified in an aqueous solution prior to being fed.

Any suitable free radical initiator may be used to prepare the macromonomer. The initiator is preferably selected based on such parameters as its solubility in one or more of the other components (e.g., monomers, water); half life at the desired polymerization temperature (preferably a half life within the range of from about 30 minutes to about 10 hours), and stability in the presence of the transition metal chelate. Suitable initiators include for example azo compounds such as 2,2'-azobis (isobutyronitrile), 4,4'-azobis(4-cyanovaleric acid), 2,2'-azobis [2-methyl-N-1,1-bis (hydroxymethyl)-2-(hydroxyethyl)]-propionamide, and 2,2'-azobis [2-methyl-N-(2-hydroxyethyl)]-propionamide; peroxides such as t-butyl hydroperoxide, benzoyl peroxide; sodium, potassium, or ammonium persulphate or combinations thereof. Redox initiator systems may also be used, such as for example persulphate or peroxide in combination with a reducing agent such as sodium metabisulphite, sodium bisulfite, sodium formaldehyde sulfoxylate, isoascorbic acid, or combinations thereof. Metal promoters, such as iron, may also optionally be used in such redox initiator systems. Also, buffers, such as sodium bicarbonate may be used as part of the initiator system.

An emulsifier is also preferably present during the aqueous emulsion polymerization process to prepare the macromonomer. Any emulsifier may be used that is effective in emulsifying the monomers such as for example anionic, cationic, or nonionic emulsifiers. In a preferred embodiment, the emulsifier is anionic such as for example sodium, potassium, or ammonium salts of dialkylsulphosuccinates; sodium, potassium, or ammonium salts of sulphated oils; sodium, potassium, or ammonium salts of alkyl sulphonic acids, such as sodium dodecyl benzene sulfonate; sodium, potassium, or ammonium salts of alkyl sulphates, such as sodium lauryl sulfate; ethoxylated alkyl ether sulfates; alkali metal salts of sulphonic acids; $C_{12}$ to $C_{24}$ fatty alcohols, ethoxylated fatty acids or fatty amides; sodium, potassium, or ammonium salts of fatty acids, such as Na stearate and Na oleate; or combinations thereof. The amount of emulsifier in the aqueous emulsion is preferably from about 0.05 weight percent to about 10 weight percent, and more preferably from about 0.3 weight percent to about 3 weight percent, based on the total weight of the monomers.

The macromonomer thus prepared is emulsion polymerized with ethylenically unsaturated monomer to form a copolymer composition containing graft copolymer particles. The polymerization is carried out by providing the macromonomer as water insoluble particles in a macromonomer aqueous emulsion and the ethylenically unsaturated monomer in a monomer composition. At least a portion of the macromonomer aqueous emulsion is combined with at least a portion of the monomer composition to form a polymerization reaction mixture that is polymerized in the presence of an initiator.

Although in no way intending to be bound in theory, it is believed that by providing the macromonomer in the form of water insoluble macromonomer particles in an aqueous emulsion, and the ethylenically unsaturated monomer in a separate monomer composition, upon combination, the ethylenically unsaturated monomer diffuses into the macromonomer particles where the polymerization occurs. Preferably, the diffusion of the ethylenically unsaturated monomer into the macromonomer particles is evidenced by swelling of the macromonomer particles.

The macromonomer aqueous emulsion useful in the present invention may be formed in any manner known to those skilled in the art. For example, the macromonomer, produced by any known method, may be isolated as a solid (e.g., spray dried) and emulsified in water. Also, for example, the macromonomer, if prepared via an emulsion or aqueous based polymerization process, may be used as is, or diluted with water or concentrated to a desired solids level.

In a preferred embodiment of the present invention, the macromonomer aqueous emulsion is formed from the emulsion polymerization of an ethylenically unsaturated monomer in the presence of a transition metal chelate chain transfer agent as described previously herein. This embodiment is preferred for numerous reasons. For example, the macromonomer polymerization can be readily controlled to produce a desired particle size distribution (preferably narrow, e.g., polydispersity less than 2). Also, for example, additional processing steps, such as isolating the macromonomer as a solid, can be avoided, leading to better process economics. In addition, the macromonomer, macromonomer aqueous emulsion and the graft copolymer can be prepared by consecutive steps in a single reactor which is desirable in a commercial manufacturing facility.

The macromonomer aqueous emulsion useful in the present invention contains from about 20 weight percent to about 60 weight percent, and more preferably from about 30 weight percent to about 50 weight percent of at least one water insoluble macromonomer, based on the total weight of macromonomer aqueous emulsion. The macromonomer aqueous emulsion may also contain mixtures of macromonomer. Preferably, the macromonomer aqueous emulsion contains less than about 5 weight percent and more preferably less than about 1 weight percent of ethylenically unsaturated monomer, based on the total weight of macromonomer aqueous emulsion.

The water insoluble macromonomer particles have a particle size to form graft copolymer of the desired particle size. For example, the final graft copolymer particles size is directly proportional to the initial particle size of the macromonomer and the concentration of ethylenically unsaturated monomers in the polymerization reaction mixture, assuming all the particles participate equally in the polymerization. Preferably, the macromonomer particles have a weight average particle size of from about 50 nm to about 500 nm, and more preferably from about 80 nm to about 200 nm as measured by Capillary Hydrodynamic Fractionation technique using a Matec CHDF 2000 particle size analyzer equipped with a HPLC type Ultra-violet detector.

The macromonomer aqueous emulsion may also include one or more emulsifying agents. The type and amount of emulsifying agent is preferably selected in a manner to produce the desired particle size. Suitable emulsifying agents include those previously disclosed for use in preparing the macromonomer by an emulsion polymerization process. Preferred emulsifying agents are anionic surfactants such as, for example, sodium lauryl sulfate, sodium dodecylbenzene sulfonate, sulfated and ethoxylated derivatives of nonylphenols and fatty alcohols. The total level of emulsifying agent, based on the total weight of macromonomer is preferably from about 0.2 weight percent to about 5 weight percent and more preferably from about 0.5 weight percent to about 2 weight percent.

The monomer composition useful in the present invention contains at least one kind of ethylenically unsaturated monomer. The monomer composition may contain all (i.e., 100%) monomer, or contain monomer dissolved or dispersed in an organic solvent and/or water. Preferably, the level of monomer in the monomer composition is from about 50 weight percent to 100 weight percent, more preferably from about 60 weight percent to about 90 weight percent, and most preferably from about 70 weight percent to about 80 weight percent, based on the total weight of the monomer composition. Examples of organic solvents that may be present in the monomer composition include $C_6$ to $C_{14}$ alkanes. The organic solvent in the monomer composition will be no more than 30 weight percent, and more preferably no more than 5 weight percent, based on the total weight of the monomer composition.

In addition to water and/or organic solvent, the monomer composition may also optionally contain monomers containing functional groups, such as, for example, monomers containing hydroxy, amido, aldehyde, ureido, polyether, glycidylalkyl, keto groups or combinations thereof. These other monomers are generally present in the monomer composition at a level of from about 0.5 weight percent to about 15 weight percent, and more preferably from about 1 weight percent to about 3 weight percent based on the total weight of the graft copolymer. Examples of functional monomers include ketofunctional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomer can provide crosslinking if desired.

In a preferred embodiment, the monomers in the monomer composition are preemulsified in water to form a monomer aqueous emulsion. Preferably, the monomer aqueous emulsion contains monomer droplets having a droplet size from about 1 micron to about 100 microns, and more preferably from about 5 micron to about 50 microns. Any suitable emulsifying agent may be used, for example those previously described, to emulsify the monomer to the desired monomer droplet size. Preferably, the level of emulsifying agent, if present, will be from about 0.2 weight percent to about 2 weight percent based on the total weight of monomer in the monomer composition.

The ethylenically unsaturated monomer of the monomer composition is preferably selected to provide the desired properties in the resulting copolymer composition. Suitable ethylenically unsaturated monomers include for example methacrylate esters, such as $C_1$ to $C_{18}$ normal or branched alkyl esters of methacrylic acid, including methyl methacrylate, ethyl methacrylate, n-butyl methacrylate, 2-ethylhexyl methacrylate, lauryl methacrylate, stearyl methacrylate, isobornyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; dienes such as 1,3-butadiene and isoprene; vinyl ethers; or combinations thereof. The ethylenically unsaturated monomer can also be an acid containing monomer or a functional monomer, such as those previously described herein. Preferably, the ethylenically unsaturated monomer of the monomer composition does not contain amino groups.

In a preferred embodiment, the monomer composition includes one or more ethylenically unsaturated monomers selected from $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; butadiene or combinations thereof.

As previously mentioned, the macromonomer aqueous emulsion and monomer composition are combined to form a polymerization reaction mixture, and polymerized in the presence of a free radical initiator to form an aqueous copolymer composition. The term "polymerization reaction mixture," as used herein, refers to the resulting mixture formed when at least a portion of the macromonomer aqueous emulsion and at least a portion of the monomer composition are combined. The polymerization reaction mixture may also contain initiator or any other additive used during the polymerization. Thus, the polymerization reaction mixture is a mixture that changes in composition as the macromonomer and monomer in the monomer composition are reacted to form graft copolymer.

The macromonomer aqueous emulsion and monomer composition may be combined in various ways to carry out the polymerization. For example, the macromonomer aqueous emulsion and the monomer composition may be combined prior to the start of the polymerization reaction to form the polymerization reaction mixture. Alternatively, the monomer composition could be gradually fed into the macromonomer aqueous emulsion, or the macromonomer aqueous emulsion could be gradually fed into the monomer composition. It is also possible that only a portion of the macromonomer aqueous emulsion and/or monomer composition be combined prior to the start of the polymerization with the remaining monomer composition and/or macromonomer aqueous emulsion being fed during the polymerization.

The initiator can also be added in various ways. For example, the initiator may be added in "one shot" to the macromonomer aqueous emulsion, the monomer composition, or a mixture of the macromonomer aqueous emulsion and the monomer composition at the start of the polymerization. Alternatively, all or a portion of the initiator can be cofed as a separate feed stream, as part of the macromonomer aqueous emulsion, as part of the monomer composition, or any combination of these methods.

The preferred method of combining the macromonomer aqueous emulsion, the monomer composition, and initiator will depend on such factors as the desired graft copolymer composition. For example, the distribution of the macromonomer as a graft along the backbone can be affected by the concentrations of both the macromonomer and the ethylenically unsaturated monomers at the time of the polymerization. In this regard, a batch process will afford high concentration of both the macromonomer and the ethylenically unsaturated monomers at the onset of the polymerization whereas a semi-continuous process will keep the ethylenically unsaturated monomer concentration low during the polymerization. Thus, through the method in which the macromonomer aqueous emulsion and monomer composition are combined, it is possible to control, for example, the number of macromonomer grafts per polymer chain, the distribution of graft in each chain, and the length of the polymer backbone.

Initiators useful in polymerizing the macromonomer and ethylenically unsaturated monomer include any suitable initiator for emulsion polymerizations known to those skilled in the art. The selection of the initiator will depend on such factors as the initiator's solubility in one or more of the reaction components (e.g. monomer, macromonomer, water); and half life at the desired polymerization temperature (preferably a half life within the range of from about 30 minutes to about 10 hours). Suitable initiators include those previously described herein in connection with forming the macromonomer, such as azo compounds such as 4,4'-azobis (4-cyanovaleric acid), peroxides such as t-butyl hydroperoxide; sodium, potassium, or ammonium persulfate; redox initiator systems such as, for example, persulphate or peroxide in combination with a reducing agent such as sodium metabisulfite, sodium bisulfite, sodium formaldehyde sulfoxylate, isoascorbic acid; or combinations thereof. Metal promoters, such as iron; and buffers, such as sodium bicarbonate, may also be used in combination with the initiator. Additionally, Controlled Free Radical Polymerization (CFRP) methods such as Atom Transfer Radical Polymerization; or Nitroxide Mediated Radical Polymerization may be used. Preferred initiators include azo compounds such as 4,4'-azobis(4-cyanovaleric acid).

The amount of initiator used will depend on such factors as the copolymer desired and the initiator selected. Preferably, from about 0.1 weight percent to about 1 weight percent initiator is used, based on the total weight of monomer and macromonomer.

The polymerization temperature will depend on the type of initiator chosen and desired polymerization rates. Preferably, however, the macromonomer and ethylenically unsaturated monomer are polymerized at a temperature of from about room temperature to about 150° C., and more preferably from about 40° C. to about 95° C.

The amount of macromonomer aqueous emulsion and monomer composition added to form the polymerization reaction mixture will depend on such factors as the concentrations of macromonomer and ethylenically unsaturated monomer in the macromonomer aqueous emulsion and monomer composition, respectively, and the desired copolymer composition. Preferably, the macromonomer aqueous emulsion and monomer composition are added in amounts to provide a copolymer containing as polymerized units of from about 2 weight percent to about 90 weight percent, more preferably from about 5 weight percent to about 50 weight percent, and most preferably from about 5 weight percent to about 35 weight percent macromonomer, and from about 10 weight percent to about 98 weight percent, more preferably from about 50 weight percent to about 95 weight percent and most preferably from about 65 weight percent to about 95 weight percent ethylenically unsaturated monomer.

One skilled in the art will recognize that other components used in conventional emulsion polymerizations may optionally be used in the method of the present invention. For example, to reduce the molecular weight of the resulting graft copolymer, the polymerization may optionally be conducted in the presence of one or more chain transfer agents, such as n-dodecyl mercaptan, thiophenol; halogen compounds such as bromotrichloromethane; or combinations thereof. Also, additional initiator and/or catalyst may be added to the polymerization reaction mixture at the completion of the polymerization reaction to reduce any residual monomer, (e.g., chasing agents). Suitable initiators or catalysts include those initiators previously described herein. In addition, the chain transfer capacity of a macromonomer through addition-fragmentation can be utilized in part to reduce molecular weight through appropriate design of monomer compositions and polymerization conditions. See e.g., E. Rizzardo, et. al., Prog. Pacific Polym. Sci., 1991, 1, 77–88; G. Moad, et. al., WO 96/15157.

Preferably, the process of the present invention does not require neutralization of the monomer, or resulting aqueous copolymer composition. These components preferably remain in unneutralized form (e.g., no neutralization with a base if acid functional groups are present).

The resulting aqueous copolymer composition formed by polymerization of the macromonomer and the ethylenically unsaturated monomer in the monomer composition preferably has a solids level of from about 30 weight percent to about 65 weight percent and more preferably from about 40 weight percent to about 60 weight percent. The aqueous copolymer composition preferably contains copolymer particles that are water insoluble and have a particle size of from about 60 nm to about 500 nm, and more preferably from about 80 nm to about 200 nm.

The graft copolymer formed preferably has a backbone containing, as polymerized units, the ethylenically unsaturated monomer from the monomer composition, and one or more side chains, pendent from the backbone, containing the macromonomer. Preferably, each side chain is formed from one macromonomer grafted to the backbone. The degree of polymerization of the macromonomer side chains is preferably in the range of from about 10 to about 1000, and more preferably in the range of from about 20 to about 200, where the degree of polymerization is expressed as the number of polymerized units of ethylenically unsaturated monomer used to form the macromonomer. The total weight average molecular weight of the graft copolymer is preferably in the range of from about 50,000 to about 2,000,000, and more preferably from about 100,000 to about 1,000,000. Weight average molecular weights as used herein can be determined by size exclusion chromatography.

The copolymer particles of the aqueous copolymer composition can be isolated, for example, by spray drying or coagulation. However, it is preferable to use the copolymer aqueous composition as is.

In a preferred embodiment of the present invention, the polymerization is conducted in two stages. In the first stage, the macromonomer is formed in an aqueous emulsion polymerization process, and in the second stage the macromonomer is polymerized with the ethylenically unsaturated monomer in an emulsion. For efficiency, preferably these two stages are conducted in a single vessel. For example, in the first stage, the macromonomer aqueous emulsion may be formed by polymerizing in an aqueous emulsion at least one first ethylenically unsaturated monomer to form water insoluble macromonomer particles. This first stage polymerization is preferably conducted using a transition metal chelate chain transfer agent as previously described herein. After forming the macromonomer aqueous emulsion, a second emulsion polymerization is preferably performed in the same vessel to polymerize the macromonomer with at least one second ethylenically unsaturated monomer. This second stage may be conducted for example by directly adding (e.g., all at once or by a gradual feed) the monomer composition and initiator to the macromonomer aqueous emulsion. One main advantage of this embodiment is that the macromonomer does not have to be isolated, and the second polymerization can take place simply by adding the monomer composition and initiator to the macromonomer aqueous emulsion.

In another preferred embodiment of the present invention, the polymerization of the macromonomer and ethylenically unsaturated monomer is at least partially performed in the presence of an acid containing monomer, acid containing macromonomer, or combinations thereof. The acid containing monomer or acid containing macromonomer may be added in any manner to the polymerization reaction mixture. Preferably, the acid containing monomer or acid containing macromonomer is present in the monomer composition. The acid containing monomer or acid containing macromonomer may also be added as a separate stream to the polymerization reaction mixture.

The amount of acid containing monomer or acid containing macromonomer added to the polymerization reaction mixture is preferably from about 0.2 weight percent to about 10 weight percent, more preferably from about 0.5 weight percent to about 5 weight percent, and most preferably from about 1 weight percent to about 2 weight percent, based on the total weight of monomer and macromonomer added to the polymerization reaction mixture.

Acid containing monomers which may be used in this embodiment include ethylenically unsaturated monomers bearing acid functional or acid forming groups such as those previously described herein. The acid containing macromonomer useful in this embodiment is any low molecular weight polymer having at least one terminal ethylenically unsaturated group that is capable of being polymerized in a free radical polymerization process, and that is formed from at least one kind of acid containing monomer. Preferably, the amount of acid containing monomer in the acid containing macromonomer is from about 50 weight percent to 100 weight percent, more preferably from about 90 weight percent to 100 weight percent, and most preferably from about 95 weight percent to 100 weight percent.

The acid containing macromonomer may be prepared according to any technique known to those skilled in the art such as those previously described herein. In a preferred embodiment of the present invention, the acid containing macromonomer is prepared by a solution polymerization process using a free radical initiator and transition metal chelate complex. An example of such a process is disclosed in for example U.S. Pat. No. 5,721,330, which is incorporated by reference in its entirety. Preferred acid containing monomers used to form the acid containing macromonomer are α-methyl vinyl monomers such as methacrylic acid.

In another preferred embodiment of the present invention, a macromolecular organic compound having a hydrophobic cavity is present in the polymerization medium used to form the macromonomer and/or aqueous copolymer composition. Preferably, the macromolecular organic compound is used when copolymerizing ethylenically unsaturated monomers with very low water solubility such as lauryl or stearyl acrylates and/or methacrylates. By "low water solubility" it is meant a water solubility at 25° C. to 50° C. of no greater than 50 millimoles/liter. For example, the macromolecular organic compound may be added to the monomer composition, the macromonomer aqueous emulsion, or the polymerization reaction mixture used to form the aqueous copolymer composition. Also, for example the macromolecular organic compound may be added to an aqueous emulsion of ethylenically unsaturated monomer used to form the macromonomer. Suitable techniques for using a macromolecular organic compound having a hydrophobic cavity are disclosed in, for example, U.S. Pat. No. 5,521, 266, the disclosure of which is hereby incorporated by reference in its entirety.

Preferably, the macromolecular organic compound having a hydrophobic cavity is added to the polymerization reaction mixture to provide a molar ratio of macromolecular organic compound to low water solubility monomer or macromonomer of from about 5:1 to about 1:5000 and more preferably from about 1:1 to about 1:500.

Macromolecular organic compounds having a hydrophobic cavity useful in the present invention include for example cyclodextrin or cyclodextrin derivatives; cyclic oligosaccharides having a hydrophobic cavity such as cycloinulohexose, cycloinuloheptose, or cycloinuloctose; calyxarenes; cavitands; or combinations thereof. Preferably, the macromolecular organic compound is β-cyclodextrin, more preferably methyl-β-cyclodextrin.

Monomers having low water solubility include for example primary alkenes; styrene and alkylsubstituted styrene; α-methyl styrene; vinyltoluene; vinyl esters of $C_4$ to $C_{30}$ carboxylic acids, such as vinyl 2-ethylhexanoate, vinyl neodecanoate; vinyl chloride; vinylidene chloride; N-alkyl substituted (meth)acrylamide such as octyl acrylamide and maleic acid amide; vinyl alkyl or aryl ethers with ($C_3$–$C_{30}$) alkyl groups such as stearyl vinyl ether; ($C_1$–$C_{30}$) alkyl esters of (meth)acrylic acid, such as methyl methacrylate, ethyl (meth)acrylate, butyl (meth)acrylate, 2-ethylhexyl (meth)acrylate, benzyl (meth)acrylate, lauryl (meth) acrylate, oleyl (meth)acrylate, palmityl (meth)acrylate, stearyl (meth)acrylate; unsaturated vinyl esters of (meth) acrylic acid such as those derived from fatty acids and fatty alcohols; multifunctional monomers such as pentaerythritol triacrylate; monomers derived from cholesterol or combinations thereof.

In another aspect of the present invention an aqueous copolymer composition is provided that is preferably produced by the method of the present invention as previously described herein. The aqueous copolymer composition contains water insoluble particles of graft copolymer that are preferably comb copolymer particles. The comb copolymer particles preferably have a weight average particle size of from about 50 nm to about 500 nm, and more preferably from about 80 nm to about 200 nm.

Preferably, the particles of graft copolymer contain from about 2 weight percent to about 90 weight percent, and more preferably from about 5 weight percent to about 50 weight percent polymerized units of a macromonomer, based on the total weight of the copolymer, where the macromonomer preferably has a composition as previously described herein for the water insoluble macromonomer present in the macromonomer aqueous emulsion. The graft copolymer particles also preferably contain from about 10 weight percent to about 98 weight percent, and more preferably from about 50 weight percent to about 95 weight percent polymerized units of at least one ethylenically unsaturated monomer, based on the total weight of the copolymer. The ethylenically unsaturated monomer may be any ethylenically unsaturated monomer that provides desirable properties in the copolymer particles, such as those useful in the monomer composition as previously described herein.

Preferably, the backbone of the graft copolymer is linear. Compositionally, the backbone of the copolymer preferably contains polymerized units of the ethylenically unsaturated monomer derived from the monomer composition. Preferably, the backbone contains less than 20 mole percent, and more preferably less than 10 mole percent of polymerized macromonomer derived from the macromonomer aqueous emulsion based on the total moles of the copolymer.

The side chains of the graft copolymer preferably contain polymerized units of the macromonomer. In a preferred embodiment of the present invention, each side chain comprises one macromonomer. Additionally, the side chains contain less than 5 weight percent and more preferably less than 1 weight percent of the polymerized ethylenically unsaturated monomer derived from the monomer composition, based on the total weight of the side chains.

Preferably, the overall weight average molecular weight of the graft copolymer is from about 50,000 to about 2,000,000, and more preferably from about 100,000 to about 1,000,000.

In a preferred embodiment of the present invention, the water insoluble copolymer particles further contain from about 0.2 weight percent to about 10 weight percent, more preferably from about 0.5 weight percent to about 5 weight percent, and most preferably from about 1 weight percent to about 2 weight percent of an acid containing macromonomer, based on the total weight of the graft copolymer. The acid containing macromonomer preferably has a composition as previously described herein.

Although in no way intending to be bound by theory, it is believed that the acid containing macromonomer is attached to the surface of the water insoluble graft copolymer particles and provides stability. By "attached," as used herein, it is believed that the acid containing macromonomer is bound in some manner (e.g., covalent, hydrogen bonding, ionic) to a polymer chain in the particle. Preferably, the acid containing macromonomer is covalently bound to a polymer chain in the particle. It has been found that the acid containing macromonomer provides stability to the particles such that the aqueous copolymer composition produced exhibits unexpected improved shear stability; freeze thaw stability; and stability to additives in formulations, as well as reduction of coagulums during the polymerization. Although improved stability can be achieved using acid containing monomer, these benefits are most dramatic when an acid containing macromonomer is used.

The aqueous copolymer composition in addition to the copolymer particles preferably contains less than about 10 weight percent, and more preferably less than about 1 weight percent of organic solvent. In a most preferred embodiment, the aqueous copolymer composition contains no organic solvent.

An advantage of using the method of the present invention to prepare the aqueous copolymer composition is that the resulting copolymer composition contains low levels of homopolymer, such as for example homopolymer of ethylenically unsaturated monomer derived from the monomer composition or homopolymer of macromonomer derived from the macromonomer aqueous emulsion. Preferably the aqueous copolymer composition contains less than about 30 weight percent and more preferably less than about 20 weight percent of homopolymer of macromonomer, based on the total weight of the graft copolymer. Preferably also the aqueous copolymer composition contains less than about 30 weight percent and more preferably less than about 20 weight percent of homopolymer of ethylenically unsaturated monomer.

The aqueous copolymer compositions produced by the method of the present invention are useful in a variety of applications. For example, the aqueous copolymer compositions may be used in architectural and industrial coatings including paints, wood coatings, or inks; paper coatings; textile and nonwoven binders and finishes; adhesives; mastics; floor polishes; leather coatings; plastics; plastic additives; petroleum additives; thermoplastic elastomers or combinations thereof.

EXAMPLES

Some embodiments of the invention will now be described in detail in the following Examples. The following abbreviations shown in Table 1 are used in the examples:

TABLE 1

| Abbreviation | Abbreviations |
|---|---|
| A-16-22 | Polystep A-16-22, anionic surfactant, supplied as 22% solids by Stepan Company, located in Northfield, Illinois. |
| BA | Butyl acrylate |
| BD | Butadiene |
| BMA | Butyl methacrylate |
| CoBF | Co(II)-(2,3-dioxyiminobutane-BF$_2$)$_2$ |
| CVA | 4,4-azobis(4-cyanovaleric acid) |
| Fe | 0.15% Ferrous sulfate in water |
| DBS | Dodecyl benzene sulfonate |
| GC | Gas chromatograph |
| SEC | Size exclusion chromatography |
| HPLC | High performance liquid chromatography |
| Init. | Initiator |
| IR | Infrared spectroscopy |
| LCCC | Liquid chromatography under critical conditions |
| MAA | Methacrylic acid |
| MMA | Methyl methacrylate |
| Mn | Number average molecular weight |
| NaMBS | Sodium metabisulfite |
| NaPS | Sodium persulfate |
| nDDM | Dodecyl mercaptan |
| OT-100 | Aerosol OT-100, anionic surfactant, supplied as 100% active by Cytec Industries Inc., located in Morristown, New Jersey. |
| PMAA-MM | Poly-methacrylic acid macromonomer |
| PMMA | Methyl methacrylate homopolymer |
| PMMA-MM | Poly-methyl methacrylate macromonomer |
| Poly-(BA-g-BMA) | Graft copolymer of BA with BMA side chains |
| Poly-(BA-g-MMA) | Graft copolymer of BA with MMA side chains |
| Poly-(BD-g-MMA) | Graft copolymer of BD with MMA side chains |
| Wako VA-044 | 2,2'-azobis[2-(2-imidazolin2-2yl)propane] dihydrochloride |

In the Examples, monomer conversion was determined by GC analysis of unreacted monomer using standard methods. Weight percent solids for the macromonomer and copolymer compositions were determined by gravimetric analysis. Particle size of the macromonomer and copolymer compositions were obtained using a Matec CHDF 2000 particle size analyzer equipped with a HPLC type Ultra-violet detector.

Except where noted differently, macromonomer was measured for number average molecular weight by SEC using a polystyrene standard from Polymer Laboratories (PS-1) having a peak average molecular weight ranging from 580 to 7,500,000 with narrow molecular weight distribution. Conversions from polystyrene to PMMA were made using Mark-Houwink constants. Copolymer compositions were evaluated for number average molecular weight and weight average molecular weight using SEC as described above.

Comparative Example 1.0

Low molecular weight MMA polymer was prepared by an aqueous emulsion polymerization process using a conventional chain transfer agent. The polymerization was conducted in a 2-liter, four neck round bottom reaction flask equipped with a mechanical stirrer, temperature control device, condenser, monomer feed line and a nitrogen inlet according to the following procedure. To the reaction flask were added 483.7 grams of deionized water, 2.0 grams of A-16-22, and 1.55 grams of an aqueous solution containing 52 wt % methyl-β-cyclodextrin to form a surfactant solution. A monomer emulsion containing 125 g of deionized water, 3 g of A-16-22, 305 g of MMA and 5 g of nDDM was prepared separately. Additionally, an initiator solution was prepared by dissolving 1.56 g of NaBS in 72.3 g of deionized water. The surfactant solution was heated to 80° C. after which 60% of the total initiator solution was added to the reaction flask. The monomer emulsion and the remaining initiator solution were then fed over a period of 60 minutes. At the end of the feed period, the reaction mixture was maintained at 80° C. for an additional 30 minutes, followed by cooling and filtering. The resulting low molecular weight MMA emulsion contained 31.0 wt % solids. The MMA polymer had a number average molecular weight (Mn) of 21700.

Examples 1.1 to 1.8

Preparation of PMMA-MM by Emulsion Polymerization

MMA macromonomer (PMMA-MM) was prepared by emulsion polymerization processes in Examples 1.1 to 1.8 using the same equipment described in Comparative Example 1.0. The specific amounts of water, surfactant, MMA, chain transfer agent (CTA), and initiator used in Examples 1.1 to 1.8 are shown in Table 2. These ingredients were added according to the following procedure. In a different flask from the reaction flask, a monomer solution was prepared by dissolving the chain transfer agent in MMA under a nitrogen purge. Deionized water and surfactant (OT-100) were introduced into the reaction flask at room temperature to form a water surfactant solution. The water surfactant solution was mixed and heated to 80° C. with stirring under a nitrogen purge. Upon reaching a temperature of 80° C., and upon complete dissolution of the surfactant, the initiator (CVA) was added to the water surfactant solution with stirring for 1 minute to permit the initiator to dissolve. After dissolution of the initiator, 20 percent by weight of the monomer solution was added to the reaction flask with stirring. Following this initial charge, the remaining monomer solution was fed over a period of 1 to 2 hours, with stirring, to form a reaction mixture. At the end of the feed period, the reaction mixture was maintained at 80° C.

for an additional 1 to 3 hours. The reaction mixture was then cooled to room temperature and passed through a filter cloth to remove any coagulum.

Generally, the resulting macromonomer emulsion contained less than 5 weight percent coagulum based on the total weight of macromonomer, and the conversion of monomer was over 99 weight percent, based on the total weight of monomer added. The Mn, weight percent solids and particle size for each macromonomer are reported in Table 2.

TABLE 2

Preparation of PMMA-MM

| Example | $H_2O$ (g) | Surfactant (g)[3] | MMA (g) | CTA ppm[1] | Initiator g[2] | Part. Size (nm) | Mn | Wt % Solids |
|---|---|---|---|---|---|---|---|---|
| 1.1 | 720 | 3.6 | 324 | 40 | 3.6 | 165 | 2430 | 32.0 |
| 1.2 | 720 | 3.6 | 324 | 8.7 | 3.6 | 126 | 12612 | 31.0 |
| 1.3 | 720 | 3.6 | 324 | 10.9 | 3.6 | 158 | 9656 | 31.0 |
| 1.4 | 720 | 3.6 | 324 | 80.6 | 3.6 | 231 | 1386 | 30.3 |
| 1.5 | 720 | 3.6 | 324 | 21.8 | 3.6 | 201 | 4416 | 29.1 |
| 1.6 | 720 | 3.6 | 324 | 10.7 | 3.6 | 169 | 7931 | 30.5 |
| 1.7 | 720 | 3.6 | 360 | 11.9 | 3.6 | 155 | 10185 | 32.0 |
| 1.8 | 1440 | 7.2 | 720 | 15.2 | 7.2 | 167 | 7237 | 32.0 |

[1]ppm moles of chain transfer agent (CoBF) based on total moles of monomer.
[2]CVA, supplied by Aldrich as a 75 weight percent aqueous solution of initiator.
[3]OT-100.

Example 2

Preparation of PMAA-MM By Solution Polymerization

An MAA macromonomer (PMAA-MM) was prepared by an aqueous solution polymerization process in a 2-liter baffled flange flask equipped with a mechanical stirrer, condenser, temperature control device, initiator feed lines and a nitrogen inlet. The apparatus was purged with nitrogen for 30 minutes after 0.018 g of CoBF was added. Deionized water, 1080 g, was charged to the flask and heated to 55° C. under a nitrogen purge. A monomer mixture containing 510 ml of MAA and 0.01 g of CoBF was prepared separately under nitrogen. When the deionized water reached a temperature of 55° C., 1.94 g of initiator (Wako VA-044) was added to the reaction flask. Following the addition of the initiator, the monomer mixture was added over a period of 60 minutes to the reaction flask with stirring. The temperature was then held at 55° C. for 2 hours following completion of the monomer mixture feed. Upon cooling the reaction flask to room temperature, the MAA-MM (Example 2.1) was isolated as dried polymer by rotary evaporation. The number average molecular weight (Mn) of the MAA-MM was determined by proton nuclear magnetic resonance to be 4030 based on the integration of the vinyl end group with respect to the methyl and methylene groups of the polymer chain.

Example 3

Preparation of Poly-(BA-g-MMA) Graft Copolymers by Batch Emulsion Polymerization Process Comparative Example 3.0C and Examples 3.1 to 3.15 graft copolymers were prepared by a batch emulsion polymerization process in a 1-liter, four neck round bottom reaction flask equipped with a mechanical stirrer, condenser, temperature control device, initiator feed lines and a nitrogen inlet. The specific amounts of PMMA-MM (as emulsion), water, surfactant, acid containing monomer (marked "acid" in Table 3), BA, initiator, and buffer used are shown in Table 3. These ingredients were added according to the following procedure. Deionized water ($H_2O$ #1 in Table 3) and PMMA-MM emulsion obtained from the example indicated in Table 3 (sub-column marked "Ex" under the "PMMA-MM" column) were introduced into the reaction flask at room temperature. A monomer emulsion of deionized water ($H_2O$ #2 in Table 3), surfactant, acid containing monomer, and BA was prepared. The monomer emulsion in Example 3.13 additionally contained 0.13 g of nDDM. The monomer emulsion was introduced into the reaction flask at room temperature with stirring to form a reaction mixture. After stirring for 20 minutes, the reaction mixture was heated to the reaction temperature indicated in Table 3.

Once the reaction temperature was reached, an initiator and optionally a buffer were introduced into the reaction flask with stirring according to the following procedures. For examples 3.1C; 3.2; 3.3 and 3.4 to 3.8, both the buffer and initiator listed in Table 3 were added as a single shot to the reaction flask. For examples 3.9 to 3.12 and 3.16, 20% by weight of the initiator solution was added in one shot to the reaction flask, with the remainder being fed over 1 to 2 hours. For the examples prepared with a redox initiator (3.13 to 3.15), one third of the NaPS and NaMBS were added in one shot to the reaction flask, with the remainder fed over 1 to 2 hours. Also, for the redox initiator system, all of the Fe and $Na_2CO_3$ were added to the reaction flask at the beginning of the NaPS and NaMBS feeds. After the initiator and buffer were added, the reaction mixture was maintained at the reaction temperature for a period of 1 to 2 hours. The resulting copolymer composition was analyzed for conversion and other properties as described in Example 10. The conversion of BA, as determined by standard GC methods, was greater than 99 weight percent based on the total weight of BA charged.

TABLE 3

Preparation of Poly-(BA-g-MMA) Graft Copolymers Prepared by Batch Process

| Example | PMMA-MM Ex | Amt. (g) | H$_2$O #1 (g) | H$_2$O #2 (g) | Surf.[2] (g) | BA (g) | Temp. (° C.) | Init. (g) | Buffer[9] (g) | Acid (g) |
|---|---|---|---|---|---|---|---|---|---|---|
| 3.1 C[8] | 1.0 | 146.7 | 22 | 25 | 2.2 | 82.6 | 90 | 0.09[5] | 0.1 | 1.96[7] |
| 3.2 | 1.4 | 100 | 14 | 20.8 | 0.49 | 55.7 | 70 | 0.63[3] | 0 | 0 |
| 3.3 | 1.3 | 97 | 17 | 20.8 | 0.49 | 55.7 | 70 | 0.63[3] | 0 | 0 |
| 3.4 | 1.1 | 50.8 | 0 | 19 | 1.1 | 47.8 | 80 | 0.07[5] | 0.05 | 0.98[7] |
| 3.5 | 1.5 | 52 | 0 | 19 | 1.1 | 47.8 | 80 | 0.07[5] | 0.05 | 0.98[7] |
| 3.6 | 1.6 | 53.3 | 0 | 20.3 | 1.1 | 47.8 | 80 | 0.07[5] | 0.04 | 0.98[7] |
| 3.7 | 1.3 | 52.4 | 0 | 19 | 1.1 | 47.8 | 80 | 0.07[5] | 0.05 | 0.98[7] |
| 3.8 | 1.2 | 52 | 0 | 19 | 1.1 | 47.8 | 80 | 0.07[5] | 0.05 | 0.98[7] |
| 3.9 | 1.3 | 216 | 59 | 46.8 | 1.1 | 123.8 | 80 | 1.05[5] | 0 | 2.3[6] |
| 3.10 | 1.3 | 84 | 77 | 39 | 0.91 | 103 | 80 | 0.07[5] | 0 | 1.3[6] |
| 3.11 | 1.3 | 42 | 42 | 102 | 1.02 | 115 | 80 | 0.07[5] | 0 | 1.3[6] |
| 3.12 | 1.3 | 21 | 112 | 46.3 | 1.08 | 122.5 | 80 | 0.07[5] | 0 | 1.3[6] |
| 3.13 | 1.8 | 71 | 0 | 20 | 1.1 | 41.3[1] | 90 | Redox[4] | 0.05 | 0.98[7] |
| 3.14 | 1.8 | 71.1 | 0 | 14 | 1.1 | 41.3 | 70 | Redox[4] | 0.05 | 0.98[7] |
| 3.15 | 1.8 | 71.1 | 0 | 14 | 1.1 | 41.3 | 95 | Redox[4] | 0.05 | 0.98[7] |
| 3.16 | 1.3 | 72.8 | 17 | 15.6 | 0.37 | 41.3 | 80 | 0.35[5] | 0 | 0.75[6] |

[1]0.13 g nDDM was added to the monomer emulsion.
[2]Ethoxylated C$_6$ to C$_{18}$ alkyl ether sulfate having from 1 to 40 ethylene oxide groups per molecule (30% active in water), except for Example 3.12 which was prepared with A-16-22.
[3]Lupersol 11 supplied by Elf Atochem.
[4]Redox initiator system contained 0.07 g NaPS in 3 g water; 0.06 g NaMBS in 3 g water; and 0.7 g Fe.
[5]NaPS dissolved in 5-20 g of water.
[6]MAA
[7]PMAA-MM (prepared by method of Example 2.1)
[8]Comparative prepared with PMMA having no terminal ethylenically unsaturated groups.
[9]Sodium carbonate dissolved in 5 g of water.

Example 4

Preparation of Poly-(BA-g-MMA) by Semi-continuous Process

In Examples 4.1 to 4.5, graft copolymers were prepared by a semi-continuous emulsion polymerization process in a 1-liter round bottom flask with four neck equipped with a mechanical stirrer, temperature control device, initiator feed lines and a nitrogen inlet. The specific amounts of PMMA-MM (as emulsion), water, surfactant, BA, acid containing monomer, and initiator used in Examples 4.1 to 4.4 are shown in Table 4. These ingredients were added according to the following procedure. A monomer emulsion of deionized water (H$_2$O #2 in Table 4), surfactant, and BA was prepared in a separate flask. The monomer emulsion in Example 4.2 additionally contained 0.13 g of nDDM. Deionized water (H$_2$O #1 in Table 4), acid containing monomer, and PMMA-MM obtained from the example indicated in Table 4 (subcolumn marked "Ex" under the "PMMA-MM" column) were introduced into the reaction flask at room temperature to form a reaction mixture. The reaction mixture was heated to the reaction temperature indicated in Table 4 while stirring under a nitrogen purge. Upon reaching the reaction temperature, an initiator and buffer (if desired) were introduced into the reaction flask with stirring according to the following procedures. For examples 4.1 to 4.3 (prepared with a redox initiator), one third of the NaPS and NaMBS, and all of the Fe and Na$_2$CO$_3$ were added in one shot to the reaction flask. The remaining NaPS and NaMBS was then cofed with the monomer emulsion over a 90 minute period. In Example 4.4, one third of the NaPS, and all of the Na$_2$CO$_3$ were added in one shot to the reaction flask, followed by cofeeding the monomer emulsion with the remaining NaPS over a 90 minute period. Upon completion of the feeds, the reaction mixture was maintained at the reaction temperature for a period of 1 to 2 hours. The resulting copolymer composition was analyzed for conversion and other properties as described in Example 10. The conversion of BA, determined by standard GC methods, was greater than 99 weight percent based on the total weight of BA charged.

TABLE 4

Preparation of Poly-(BA-g-MMA) Prepared by Semi-Continuous Process

| Example | PMMA-MM Ex | Amt. (g) | H$_2$O #1 (g) | H$_2$O #2 (g) | Surf.[2] (g) | BA (g) | Temp. (° C.) | Init. (g) | Buffer[5] (g) | Acid (g)[6] |
|---|---|---|---|---|---|---|---|---|---|---|
| 4.1 | 1.7 | 69.4 | 12 | 23 | 1.1 | 41.3 | 90 | Redox[3] | 0.05 | 0.98 |
| 4.2 | 1.8 | 71 | 10.0 | 10 | 1.1 | 41.3[1] | 90 | Redox[3] | 0.11 | 0.98 |

TABLE 4-continued

Preparation of Poly-(BA-g-MMA) Prepared by Semi-Continuous Process

| Example | PMMA-MM Ex | Amt. (g) | H$_2$O #1 (g) | H$_2$O #2 (g) | Surf.[2] (g) | BA (g) | Temp. (° C.) | Init. (g) | Buffer[5] (g) | Acid (g)[6] |
|---|---|---|---|---|---|---|---|---|---|---|
| 4.3 | 1.8 | 71 | 10.0 | 10 | 1.1 | 41.3 | 90 | Redox[3] | 0.11 | 0.98 |
| 4.4 | 1.8 | 71 | 10.3 | 18 | 1.1 | 41.3 | 90 | 0.16[4] | 0.11 | 0.98 |

[1]0.13 g nDDM was added to the monomer emulsion.
[2]Ethoxylated C$_6$ to C$_{18}$ alkyl ether sulfate having from 1 to 40 ethylene oxide groups per molecule (30% active in water).
[3]Redox initiator system include 0.16 g NaPS in 6 g water; 0.14 g NaMBS in 6 g water; and 0.7 g Fe.
[4]NaPS dissolved in 10 g of water.
[5]Sodium carbonate dissolved in 3 g of water.
[6]PMAA-MM (prepared by method of Example 2.1)

Example 5

Preparation of Poly-(BD-g-MMA) Graft Copolymers

A graft copolymer having a backbone of BD and side chains of MMA was prepared in accordance with the method of the present invention. The graft copolymer was prepared in two stages. In the first stage, PMMA-MM was prepared in accordance with the procedure used in Example 1, except that the following amounts of ingredients shown in Table 5a were used to replace the corresponding ingredients in Table 2:

TABLE 5a

Ingredients used in Preparation of BMA Macromonomer

| Ingredient | Amount Charged |
|---|---|
| H$_2$O | 2380 g |
| Surfactant (A-16-22) | 55 g |
| MMA | 1197 g |
| CoBF | 10.9 ppm[1] |
| Initiator (CVA) | 12.6 g |

[1]Based on total moles of MMA monomer.

The resulting PMMA-MM had an Mn of 10,200.

In the second stage, a graft poly-(BD-g-MMA) was prepared in a steel pressure reactor equipped with a mechanical stirrer, temperature control device, and feed lines. Ingredients A through D, shown in Table 5b, were charged to the reactor at room temperature. The reactor was then sealed and vacuum was applied, with stirring, to reduce the reactor pressure to 15 inches of Hg. Butadiene (E) in Table 5b was quickly pumped into the reactor and stirred for 10 minutes. Following stirring the reaction mixture was heated to 60° C. for 30 minutes. After the reactor temperature stabilized to 60° C., ingredients F, G, and H in Table 5b were gradually pumped into the reactor over a period of 7 hours. Following completion of the feeds, the reaction mixture was held for 60 minutes at 60° C.

TABLE 5b

Ingredients used in Preparation of Poly-(BD-g-MMA) Graft Copolymer

| | Ingredient | Amount Charged |
|---|---|---|
| A | H$_2$O #1 | 6049.4 g |
| B | Acetic acid | 4.3 g |

TABLE 5b-continued

Ingredients used in Preparation of Poly-(BD-g-MMA) Graft Copolymer

| | Ingredient | Amount Charged |
|---|---|---|
| C | PMMA-MM (as emulsion) | 1389.71 g (Example 5a) |
| D | H$_2$O #2 (use for rinsing) | 250 g |
| E | BD | 877.5 g |
| F | t-butyl peroxide (2% solution) | 197.44 g |
| G | SFS[1] (1% solution) | 263.25 g |
| H | Aerosol-OT (75% solution) | 3.51 g |

[1]Sodium formaldehyde sulfoxylate

Example 6

Preparation of Poly-(BA-g-BMA) Graft Copolymer

A graft copolymer having a backbone of BA and side chains of BMA was prepared in accordance with the method of the present invention. The graft copolymer was prepared in two stages. In the first stage, butyl methacrylate macromonomer was prepared in accordance with the procedure used in Example 1, except that the following amounts of ingredients shown in Table 6a were used to replace the corresponding ingredients in Table 2:

TABLE 6a

Ingredients used in Preparation of BMA Macromonomer

| Ingredient | Amount Charged |
|---|---|
| H$_2$O | 720 g |
| Surfactant (Aerosol OT-100) | 3.6 g |
| BMA | 324 g |
| CoBF | 10.9 ppm[1] |
| Initiator (CVA) | 3.6 g |

[1]Based on total moles of BMA monomer

The resulting BMA macromonomer had an Mn of 8900.

In the second stage, a graft poly-(BA-g-BMA) was prepared using the procedure described in Example 3, except that the following amounts of ingredients shown in Table 6b were used to replace the corresponding ingredients in Table 3, and a reaction temperature of 85° C. was used.

TABLE 6b

Ingredients used in Preparation of Poly-(BA-g-BMA) Graft Copolymer

| Ingredient | Amount Charged |
| --- | --- |
| PBMA-MM (as emulsion) | 84.1 g (Example 6a) |
| H$_2$O #2 | 15 g |
| Surfactant[(2)] | 1.1 g |
| BA | 41.3 g |
| Initiator | Redox[(1)] |
| Acid (PMAA-MM) | 0.98 g (Example 2.1) |

[(1)]Redox initiator system was 0.07 g NaPS in 3 g water; 0.06 g NaMBS in 3 g water; 0.05 g Na$_2$CO$_3$ in 3 g water and 0.7 g Fe.
[(2)]Ethoxylated C$_6$ to C$_{18}$ alkyl ether sulfate having from 1 to 40 ethylene oxide groups per molecule (30% active in water).

The graft copolymer formed contained 63.5 weight percent BA, 35 weight percent of PBMA-MM and 1.5 weight percent of PMAA-MM.

Example 7

Preparation of Poly-(Styrene-g-MMA) Graft Copolymer

A graft copolymer having a backbone of styrene and side chains of PMMA-MM was prepared in accordance with the method of the present invention. The graft copolymer was prepared in two stages. Macromonomer PMMA-MM (obtained from Example 1.8) was used in the synthesis of the graft Poly-(Styrene-g-MMA). The graft Poly-(Styrene-g-MMA) was prepared using the procedure described in Example 3 except that the following amounts of ingredients shown in Table 7 were used to replace the corresponding ingredients in Table 3, and a reaction temperature of 85° C. was used.

TABLE 7

Ingredients used in Preparation of Poly-(Styrene-g-MMA) Graft Copolymer

| Ingredient | Amount Charged |
| --- | --- |
| PMMA-MM (as emulsion) | 84.1 g (Example 1.8) |
| H$_2$O #2 | 15 g |
| Surfactant[(2)] | 1.1 g |
| Styrene | 41.3 g |
| Initiator | Redox[(1)] |
| Acid (pMAA-MM) | 0.98 g (Example 2.1) |

[(1)]Redox initiator system include 0.07 g NaPS in 3 g water; 0.06 g NaMBS in 3 g water; 0.05 g Na$_2$CO$_3$ in 3 g water and 0.7 g Fe.
[(2)]Ethoxylated C$_6$ to C$_{18}$ alkyl ether sulfate having from 1 to 40 ethylene oxide groups per molecule (30% active in water).

The graft copolymer formed contained 63.5 weight percent styrene, 35 weight percent of PMMA-MM and 1.5 weight percent of PMAA-MM.

Example 8

Preparation of Poly-(BA-g-MMA) by a Single Vessel Synthesis Procedure

A graft copolymer having a backbone of BA and side chains of MMA was prepared in accordance with the method of the present invention in a single vessel in two aqueous emulsion polymerization stages. In the first stage, PMMA-MM was prepared and in the second stage the PMMA-MM was copolymerized with BA.

The PMMA-MM was prepared in a four neck, 5-liter round bottom reaction flask equipped with a mechanical stirrer, temperature control device, condenser, monomer feed line and a nitrogen inlet. The reaction flask was charged with 680 g of deionized water and 15.7 g of A-16-22 to form a water surfactant solution. The water surfactant solution was heated with stirring to 80° C. under a nitrogen purge. At 80° C., 3.6 g of 4,4-azobis(4-cyanovaleric acid) was added with stirring to the reaction flask. Two minutes later, 18 g of MMA was added to the reaction flask with stirring. A monomer mixture containing 342 g of MMA and 0.02 g of CoBF was prepared separately and degassed by bubbling nitrogen in the monomer mixture for 20 minutes. A 20% by weight portion of the monomer mixture was added to the reaction flask 10 minutes after adding the 18 g of MMA. The remainder of the monomer mixture was fed over 120 minutes with stirring while maintaining the temperature at 80° C. At the end of the monomer mixture feed, the temperature of the reaction mixture in the flask was kept at 80° C. for 60 minutes and then cooled to 40° C. The resulting macromonomer aqueous emulsion was reacted in the same vessel in a second stage as described below.

In the second stage, a monomer emulsion containing 226 g of deionized water, 16.52 g of an ethoxylated C$_6$ to C$_{18}$ alkyl ether sulfate (30 wt % active) having from 1 to 40 ethylene oxide groups per molecule (30% active in water), 658 g of butyl acrylate was prepared. In addition, 10.2 g of PMAA-MM, in 75.4 g of water was prepared separately. The monomer emulsion and the PMAA-MM solution were added to the reaction flask at 40° C., and the resulting reaction mixture was stirred for 20 minutes, followed by heating to 85° C. At 85° C., 1.06 g-of sodium persulfate dissolved in 25 g of water and 0.47 g of sodium carbonate dissolved in 25 g of were added to the reaction flask in a single shot, followed with 20 g of deionized water rinse. Following the charges of initiator and buffer, the reaction mixture was maintained with stirring at 85° C. for 60 minutes. After cooling the reaction mixture to 40° C., 13.72 g of a 0.15% solution of FeSO$_4$ in water was added with stirring, followed by additions of t-butyl peroxide and isoascorbic acid (0.70 g and 0.34 g each in 15 g of water, respectively). A second addition of t-butyl peroxide and isoascorbic acid in the same amounts were added 15 minutes after the first one. The reaction mixture was held with stirring for 30 minutes at a temperature of 40° C.

The resulting copolymer composition was cooled to room temperature and passed through a filter cloth to remove any coagulum. The resulting graft copolymer contained 64 weight percent of butyl acrylate, 35 weight percent of methyl methacrylate and 1 weight percent of PMAA-MM. The copolymer composition had an incorporation of PMAA-MM of 76 weight percent based on the total weight of PMAA-MM charged.

Example 9

Characterization of Copolymer Compositions

Graft copolymer compositions prepared in the previous examples were characterized by various analytical techniques to determine wt % solids, particle size, weight average molecular weight, number average molecular weight, and percent incorporation of macromonomer.

Determination of the amount of unreacted macromonomer was carried out by HPLC analysis using the following procedure. The copolymer compositions were dissolved in THF and analyzed by gradient elution on an LC-18 column supplied by Supelco, located in Bellefonte, Pa. such that a well-isolated peak was observed for the unreacted macromonomer. Quantification was carried out by calibrating the detector response using known standards of the same macromonomer employed in the synthesis. The results of the characterization are reported in Table 8 below.

TABLE 8

Characterization Of Copolymer Compositions

| Example | % Solids | Particle Size (nm) | Mw (×10$^{-3}$) | Mn (×10$^{-3}$) | PMMA-MM Incorp.[2] (wt %) |
|---|---|---|---|---|---|
| 3.1 C | 43 | 120 | [1] | [1] | <2 |
| 3.2 | 43.1 | 268 | 119.7 | 88.6 | 89 |
| 3.3 | 41.0 | 204 | 286.0 | 29.0 | — |
| 3.4 | 49.3 | 245 | 398.1 | 217.7 | 90 |
| 3.5 | 50.2 | 215 | 708.2 | 378.3 | 86 |
| 3.6 | 51.5 | 228 | 1015.0 | 266.9 | 68 |
| 3.7 | 48.1 | 226 | 1242.6 | 809.6 | 74 |
| 3.8 | 47.5 | 215 | 1082.6 | 827.4 | 71 |
| 3.9 | 42.2 | 180 | 724.9 | 114.2 | — |
| 3.10 | 41.3 | 203 | 1468.9 | 875.5 | — |
| 3.11 | 39.6 | 208 | 1263.8 | 964.0 | — |
| 3.12 | 39.7 | 227 | 1226.1 | 813.1 | — |
| 3.13 | 43.5 | 232 | 226.1 | 88.8 | 83 |
| 3.14 | 44.6 | 208 | 795.8 | 182.0 | 75 |
| 3.15 | 44.4 | 220 | 437.1 | 160.3 | 88 |
| 3.16 | 41.4 | 194 | 216.1 | 139.3 | 71 |
| 4.1 | 34 | 222 | 533.3 | 66.6 | 86 |
| 4.2 | 43.5 | 210 | 264.5 | 67.3 | 91 |
| 4.3 | 42.3 | 181 | 664.8 | 83.2 | 94 |
| 4.4 | 42.8 | 168 | 857.9 | 72.1 | 94 |
| 6.1 | 39.3 | 192 | 552.0 | 328.0 | — |
| 7.1 | 33.1 | 161 | 98.7 | 20.7 | 60 |
| 8.1 | 44 | 150 | 1041.6 | 146.9 | 76 |

[1]Bimodal molecular weight distribution with the lower molecular weight corresponding to the molecular weight of the macromonomer, indicating that the polymer prepared according to Example 1.0 C did not copolymerize.
[2]Based on the total weight of macromonomer added to reaction vessel. Some of the samples (Example 3.3, 3.9, 3.10, 3.11, 3.12, 6.1) were not analyzed for PMMA-MM incorporation.

Example 10

Analysis of Example 3.16

A two-dimensional HPLC analysis was carried out on Example 3.16 to determine the average number of grafts per polymer molecule and to show that a graft copolymer is formed. Two-dimensional HPLC provides much greater resolution compared to conventional HPLC for the separation of complex polymer materials. The method used in this analysis was similar to that described in "2D Chromatographic Analysis Of Graft Copolymers Obtained By Copolymerization Of Macromonomers Via Conventional, Controlled Radical, And Anionic Polymerizations" by Müller, Axel H. E et al., Polym. Prepr., Am. Chem. Soc., Div. Polym. Chem., 40(2), pages 140–141, 1999, which is hereby incorporated by reference in its entirety. LCCC was used in one dimension and GPC was used in the second dimension; cuts from the first analysis were sequentially analyzed by the second technique, and appropriate software constructed a plot of the data in two dimensions. The LCCC analysis was run under critical conditions for PBA, and size exclusion conditions for PMMA so that the total molecular weight of the MMA grafts on the copolymer could be determined. From this value, (assuming each side chain contained one macromonomer) the number of side chains per copolymer was calculated. Also, LCCC was used to determine the composition of the copolymer. The analysis in the second dimension using SEC was used to estimate the total molecular weights of the copolymer. The molecular weights measured were calibrated using standards of PMMA for the LCCC dimension and PBA for the GPC dimension. The resulting two-dimensional chromatogram showed a major copolymer peak (roughly estimated at >70%) which, from the LCCC data, contained a total PMMA molecular weight (Mn) of about 110,000. Using the Mn value of 9600 for the PMMA macromonomer, an average number of grafts per polymer chain was estimated at about 11.5. From the second dimension the overall molecular weight of this peak was estimated to be 580,000. The two-dimensional chromatogram showed two other series of copolymer peaks, but no PBA homopolymer was detected. The overall composition of the major copolymer peak calculated from the two-dimensional HPLC data was about 85 wt % BA and 15 wt % MMA. This composition varies from the expected composition of 72 wt % BA and 28 wt % MMA (calculated from an NMR analysis of the composition, taking into account that only about 70% of the macromonomer was converted to copolymer), but is reasonable considering the complexity of the copolymer system and the analysis of it.

Example 11

Evaluation of Shear Stability of Graft Copolymer Compositions

Shear stability tests were carried out on several graft copolymer compositions made in the previous examples. Shear stability was tested by placing a drop of the graft copolymer composition on the index finger and rubbing the composition between the thumb and index finger. A copolymer composition passed if it could be rubbed until it dried by water evaporation without the formation of coagulum, and failed if it flocculated after a few rubs and became ropy. All of the copolymer compositions tested were stable colloidally under static conditions. The results are reported in Table 9 below.

TABLE 9

Finger Rub Test Results for Graft Copolymer Compositions

| Example | Stabilized acid | Finger Rub Test |
|---|---|---|
| 3.4 | pMAA-MM | Pass |
| 3.5 | pMAA-MM | Pass |
| 3.6 | pMAA-MM | Pass |
| 3.7 | pMAA-MM | Pass |
| 3.8 | pMAA-MM | Pass |
| 3.9 | MAA | Fail |
| 3.10 | MAA | Fail |
| 3.11 | MAA | Fail |
| 3.12 | MAA | Fail |
| 4.1 | pMAA-MM | Pass |
| 4.2 | pMAA-MM | Pass |
| 4.3 | pMAA-MM | Pass |
| 4.4 | pMAA-MM | Pass |
| 8.1 | pMAA-MM | Pass |

The data in Table 9 shows that graft copolymer compositions prepared with an acid containing macromonomer had surprisingly good shear stability in comparison to graft copolymer prepared with an acid monomer. It was also discovered that good shear stability could be obtained, without the use of an acid containing macromonomer, such as by adding a surfactant such as Triton™ X-405, a nonionic surfactant supplied by Union Carbide, to the copolymer composition.

What is claimed is:

1. A copolymer composition comprising water insoluble graft copolymer particles, wherein the graft copolymer particles comprise:
   (a) from 2 weight percent to 90 weight percent of macromonomer, as polymerized units, based on the total weight of the copolymer, wherein:
      (i) the macromonomer is water insoluble and comprises from 10 to 1000 polymerized units of at least one first ethylenically unsaturated monomer, no polymerized mercapto-olefin compounds, and less than 5 weight percent polymerized acid-containing monomer;
      (ii) the macromonomer is a macromonomer prepared by aqueous based polymerization; and
      (iii) said macromonomer has a molecular weight distribution such that its ratio of Mw/Mn is at least 1.25, wherein said Mw is the weight average molecular weight of the macromonomer and said Mn is the number average molecular weight of said macromonomer; and
   (b) from 10 weight percent to 98 weight percent of polymerized units of at least one second ethylenically unsaturated monomer, based on the total weight of the copolymer.

2. The copolymer composition of claim 1 wherein the macromonomer comprises from 20 to 200 polymerized units of at least one first ethylenically unsaturated monomer.

3. The copolymer composition of claim 1 wherein the macromonomer comprises as polymerized units less than 1 weight percent acid containing monomer, based on the total weight of the macromonomer.

4. The copolymer composition of claim 3 wherein the copolymer composition further comprises from 0.2 weight percent to 10 weight percent of an acid containing macromonomer, based on the total weight of the copolymer.

5. The copolymer composition of claim 4 wherein the acid containing macromonomer is attached to the surface of the copolymer particles.

6. The copolymer composition of claim 4 wherein the acid containing monomer is present, as polymerized units, in the acid containing macromonomer at 50 weight percent to 100 weight percent, based on the weight of the acid containing macromonomer.

7. The copolymer composition of claim 3 wherein the acid containing monomer is present, as polymerized units, in the acid containing macromonomer at 90 weight percent to 100 weight percent, based on the weight of the acid containing macromonomer.

8. The copolymer composition of claim 1 wherein the graft copolymer comprises a backbone and one or more side chains, wherein the side chains are pendant from the backbone and comprise the water insoluble macromonomer, and wherein the backbone comprises the polymerized units of the second ethylenically unsaturated monomer.

9. The copolymer composition of claim 1 wherein the first ethylenically unsaturated monomer is an α-methyl vinyl monomer, a non α-methyl vinyl monomer terminated with a α-methyl vinyl monomer, or combinations thereof.

10. The copolymer composition of claim 9 wherein the first ethylenically unsaturated monomer is methyl methacrylate, ethyl methacrylate, 2-ethylhexyl methacrylate, isobornyl methacrylate, butyl methacrylate, lauryl methacrylate, stearyl methacrylate, styrene terminated by α-methyl styrene, or combinations thereof.

11. The copolymer composition of claim 1 wherein the second ethylenically unsaturated monomer is selected from the group consisting of acrylate esters; methacrylate esters; styrene; substituted styrenes; olefinically unsaturated nitriles; olefinically unsaturated halides; vinyl esters of organic acids; N-vinyl compounds; acrylamide; methacrylamide; substituted acrylamides; substituted methacrylamides; hydroxyalkylmethacrylates; hydroxyalkylacrylates; vinyl ethers; dienes and combinations thereof.

12. The copolymer composition of claim 11 wherein the second ethylenically unsaturated monomer is selected from the group consisting of $C_1$ to $C_{18}$ alkyl acrylate, styrene, butadiene, and combinations thereof.

13. The copolymer composition of claim 1 wherein the graft copolymer is a graft copolymer prepared by a method comprising:
   (a) forming a macromonomer aqueous emulsion comprising one or more water-insoluble particles of the macromonomer, wherein the macromonomer has at least one terminal ethylenically unsaturated group;
   (b) forming a monomer composition comprising at least one second ethylenically unsaturated monomer; and
   (c) combining at least a portion of the macromonomer aqueous emulsion and at least a portion of the monomer composition to form a polymerization reaction mixture and polymerizing the macromonomer with the second ethylenically unsaturated monomer in the presence of an initiator to produce a copolymer composition comprising graft copolymer particles.

* * * * *